United States Patent Office 3,271,056
Patented Sept. 6, 1966

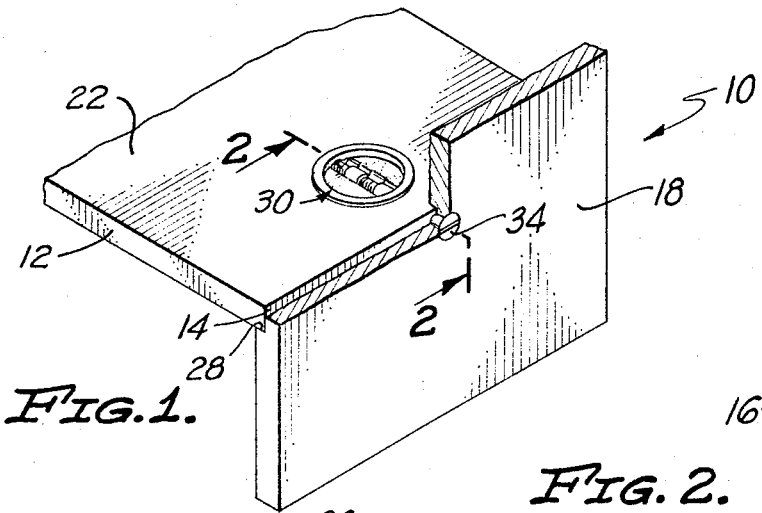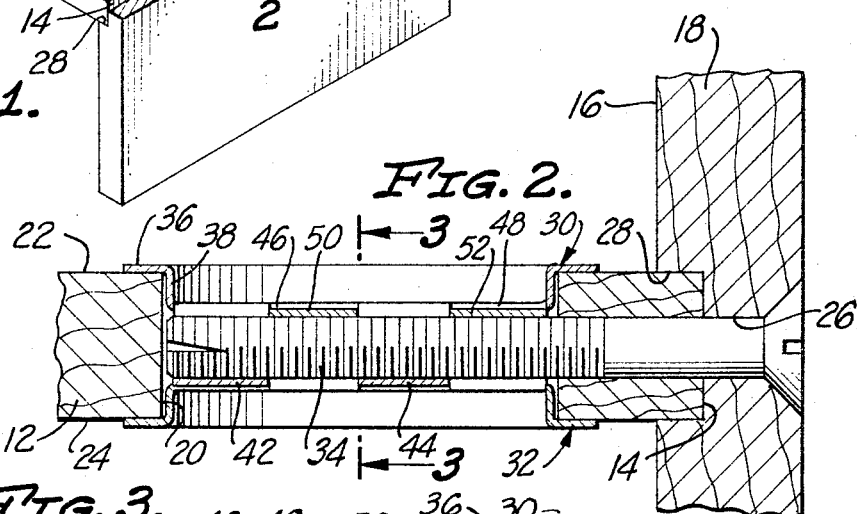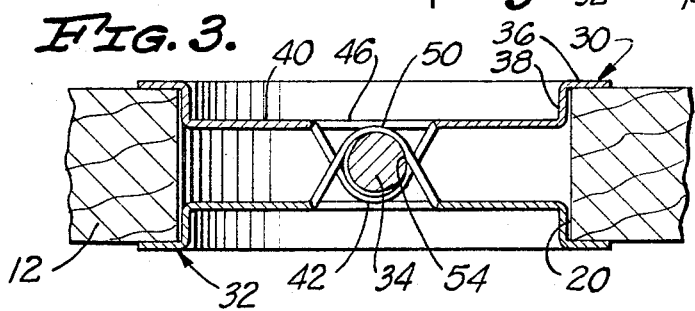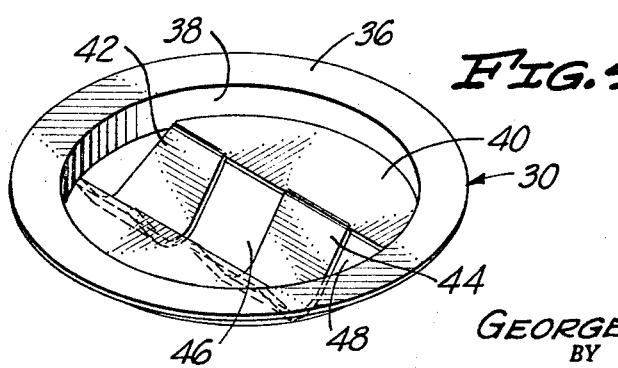

3,271,056
FASTENING DEVICE
George W. Frisbey, Jr., Garden Grove, Calif.
(7899 Westminster Ave., Westminster, Calif.)
Filed Dec. 3, 1963, Ser. No. 327,687
2 Claims. (Cl. 287—20.92)

This invention is directed to a fastening device particularly applicable to the fastening of a butt edge against the side of another piece.

In the art of fastening it has been historically most difficult to fasten the edge of one piece of material to another. In woodworking a great many different methods have been designed with varying effectiveness. Dovetail fastening has been the most satisfactory but requires very particular care to make proper fits, and of course requires specialized machinery to make a satisfactory dovetail joint. If the volume of work to be produced is not sufficient to warrant the purchase or set-up of special dovetail machinery, such fastening is out of the question. Dadoes or rabbets have been used for many years where the edge of one piece is to be fastened against the side of another. Such fastening however, has the disadvantage of not being completely secure against the pullout of the butt fastened piece. There is no structure inherent in such a joint to resist pullout.

Accordingly, it is an object of this invention to provide a fastening means particularly suited to the securement of the butt edge of one piece of material against another piece in a firm and rigid manner.

It is another object of this invention to provide a butt fastening device capable of being used to make easy and rigid joints between the butt edge of one piece and the side of another.

It is another object of this invention to provide an economic butt fastening device which is within the economic reach of those desiring to make rigid fastenings of such configurations.

Other objects and advantages of this invention will become apparent upon the study of the following portion of the specification, the claims and the attached drawings in which;

FIG. 1 is an isometric view with parts broken away showing the butt fastening device of this invention securing the butt edge of one piece of material against the side of another;

FIG. 2 is a view generally taken along the line 2—2 of FIG. 1;

FIG. 3 is a view taken along the line 3—3 of FIG. 2; and

FIG. 4 is an isometric detailed view of one of the securing elements to the instant butt fastening device.

As an aid to understanding this invention, it can be stated in essentially summary form that it is directed to a fastening device particularly suited to fastening the butt edge of one piece against the side of another. Two identical elements of this device are inserted into opposite sides of a hole through the piece to be butt fastened. These devices are of such configuration that interlocking fingers therein define a receptacle for a screw at right angles to the first hole. A second hole extends through the piece to be side fastened and through the piece to be edge fastened on a common axis with the hole defined by the elements. A headed screw passing therethrough engages with the side fastened piece and locks into the fingers to hold the elements in their hole and to urge the butt of the butt fastened piece against the side of the other piece.

This invention will be understood in more detail by reference to the drawings and the following portion of the specification. In FIG. 1 is seen an assembly 10 which incorporates the fastening device of this invention. The assembly comprises a first piece of material 12 having a butt edge 14 which is desired to be secured to the side 16 of a second piece of material 18. As can be better seen in FIGS. 2 and 3, the first piece of material 12 has a relatively large hole 20 extending all the way through the piece 12 from the upper side 22 to the lower side 24. A second hole 26 extends through the second piece of material 18 and through the butt edge 14 of the piece 12 to intersect with hole 20 at generally right angles to the axis thereof. It is desired that the axes of these holes intersect, and they intersect at right angles, but small deviations from the ideal are permissible within the satisfactory use of the fastening device of this invention.

The first piece of material 12 has its butt edge entered into the second piece 16 at a rabbet or dado 28. Such a rabbet joint provides additional stability, particularly from rotation about the axis for the second hole 26, but would be unnecessary if two of the fastening devices of this invention are used longitudinally of the butt edge 14. This fastening device is most statisfactory in wood and in wood product materials, and it is clear that it is usable in plywood and various composition boards containing wood chips and/or similar materials and a binder such as phenolic resin or other common binders. While the fastening device is also usable in the making of joints between metallic members, other convenient fastening means are available for such structures. However, where the first piece of material is nonmetallic and the second is metallic, the joint of this invention also finds considerable application.

The fastening device of this invention comprises two interlocking parts passing into the large hole 20, and a locking screw to secure the assembly. These parts comprise upper insert 30 and lower insert 32 which are inserted into the hole 20 and interlocked therein by means of screw 34 located in the second hole 26. Each of the inserts 30 and 32 is identical, and is manufactured in such a way that it may be made on the same die and that when inserted in opposite sides of the hole 20 may be oriented so that the fingers thereon interlock, as becomes apparent from the further study of this specification. Since the inserts are identical, the insert 30 will be primarily described. The insert 30 has an annular flange 36 which is adapted to engage the upper side 22 of the first piece 12 around the periphery of hole 20. Cylindrical section 38 depends from flange 36 and is of such dimension as to fit within the hole 20 with slight clearance. Cylindrical section 38 terminates in a bottom 40 which substantially closes the cylindrical section 38. Portions of bottom 40 are depressed to form fingers 42 and 44, and openings 46 and 48 are formed in the bottom 40 to receive the corresponding fingers on the lower insert 32. As is seen in FIGS. 2 and 3, the lower insert 32 has fingers 50 and 52 which enter adjacent the openings 46 and 48 respectively and interengage with the fingers 42 and 44 to provide a central screw receiving opening 54 substantially coaxial with the second hole 26 and with the screw 34 therein, and intersecting with the axis of the large hole 20 at substantially right angles with respect thereto.

When the pieces to be fastened are provided with holes as indicated in FIGS. 1 and 2, and the upper and lower inserts are positioned as is shown therein, the screw 34 can be passed through the second hole 26 to engage between the fingers into the screw receiving opening 54. The screw 34 is preferably of self tapping nature, and preferably has some taper so as to securely lock the inserts 30 and 32 in place when it is screwed therebetween. The amount of taper is dependent on the resiliency of the material of the inserts and the thickness tolerance of the first piece of material 12. If it is desired that the inserts be capable of being used over a plurality of thicknesses of the first piece of material, greater resiliency is designed therein and a screw 34 of greater taper is provided. While it is clear that metal is a desirable material from which this fastening device can be made, especially by stamping techniques from sheet metal, it is clear that it may be manufactured from polymer composition materials and particularly by injection molding technique, especially for the smaller sizes.

For appearance sake a closure can readily be furnished for pressing into the interior of the cylindrical section 38 to give a smooth appearance from the external view point.

Furthermore, if appearance is of considerable concern, the annular flange 36 could be a solid disk with the remaining structure of the inserts secured to the inner side thereof.

This invention having been described in its preferred embodiment, it is apparent that it is capable of numerous modifications and embodiments within the scope of the ability of the routine engineer without the use of inventive faculty. Accordingly the scope of the following claims defines the scope of this invention.

I claim:

1. A fastened assembly comprising a first piece of material having an end, first and second sides and a first hole extending through said first piece of material from said first side to said second side thereof, first and second inserts engaged in said hole in said first piece of material, said first insert having a surface engaged upon said first side of said first piece of material and said second insert having a surface engaging upon said second side of said first piece of material, said first hole in said first piece of material having an axis and each of said inserts having an axis, said inserts being inserted in said first hole so that said axes of said inserts are substantially coincidental and are substantially parallel to said axis of said first hole, said first and second inserts each having fingers thereon, said fingers being positioned in overlapped relationship and defining a screw receiving opening, said fingers being located between said first and second sides of said first piece of material, said screw receiving opening having an axis at an angle to said axis of said first hole in said first piece of material, a second hole in the end of said first piece of material, said second hole having an axis which is substantially coincidental with said axis of said screw receiving opening, and a screw passing through said second hole and into said screw receiving opening so that said screw engages with fingers and prevents separation of said first and second inserts.

2. The structure of claim 1 wherein said first and second inserts are substantially identical.

References Cited by the Examiner

UNITED STATES PATENTS

| 2,414,628 | 1/1947 | Battin | 52—227 |
| 2,780,328 | 2/1957 | Yoder | 85—32 |
| 2,818,764 | 1/1958 | Switzer | 85—32 |
| 2,917,966 | 12/1959 | Kahn | 85—32 |
| 3,006,231 | 10/1961 | Kahn | 85—32 |
| 3,088,178 | 5/1963 | Propst | 52—585 |

FOREIGN PATENTS 648,218   7/1937   Germany.

FRANK L. ABBOTT, *Primary Examiner.*

EDWARD C. ALLEN, *Examiner.*

R. S. BRITTS, J. E. MURTAGH, *Assistant Examiners.*